US005987405A

United States Patent [19]

Bantz et al.

[11] Patent Number: 5,987,405

[45] Date of Patent: Nov. 16, 1999

[54] SPEECH COMPRESSION BY SPEECH RECOGNITION

[75] Inventors: David Frederick Bantz, Chappaqua, N.Y.; Robert Joseph Zavrel, Jr., Chapel Hill, N.C.

[73] Assignee: International Business Machines Corporation, Armonk, N.Y.

[21] Appl. No.: 08/881,435

[22] Filed: Jun. 24, 1997

[51] Int. Cl.[6] ................................ G10L 5/00; H04B 1/66

[52] U.S. Cl. .......................... 704/220; 704/235; 704/236; 704/500; 704/501

[58] Field of Search .................................... 704/219, 220, 704/260, 270, 201, 231, 235, 236, 500, 501, 503, 504; 379/88.18

[56] References Cited

U.S. PATENT DOCUMENTS

| | | | |
|---|---|---|---|
| 4,912,768 | 3/1990 | Benbassat | 704/260 |
| 5,138,662 | 8/1992 | Amano et al. | 704/220 |
| 5,224,167 | 6/1993 | Taniguchi et al. | 704/220 |
| 5,696,879 | 12/1997 | Cline et al. | 704/260 |
| 5,704,009 | 12/1997 | Cline et al. | 704/270 |
| 5,724,410 | 3/1998 | Parvulescu et al. | 379/88.18 |
| 5,809,464 | 9/1998 | Kopp et al. | 704/235 |

*Primary Examiner*—David R. Hudspeth
*Assistant Examiner*—Martin Lerner
*Attorney, Agent, or Firm*—Anne Vachon Dougherty; Douglas W. Cameron

[57] ABSTRACT

A method of transmitting speech signals with reduced bandwith requirements. With this invention an original speech signal is first converted to a textual representation, and a facsimile of the original speech is determined from the textual representation. Then a minimum error turn is derived from the difference between the original speech signal and the facsimile of the original speech signal. The minimum error turn is then compressed, and it is this compressed minimum error turn, along with the textual representation, that is transmitted on the communications medium. At the receiving end, the textual representation and the difference representation are split through a demultiplexer. The textual representation is then passed through a synthesizer while the difference representation is passed through a mapper. The synthesizer along with synthesis parameter storage converts the textual representation into a digital representation of speech, while the mapper modifies the received difference representation by applying sub or super sampling corrections.

26 Claims, 7 Drawing Sheets

SPEECH COMPRESSION BY SPEECH RECOGNITION

DESCRIPTION

1. Technical Field

The invention relates to systems for the conveyance and reproduction of natural human speech using data communication facilities with reduced bandwidth requirements.

2. Description of the Prior Art

Alternative solutions to the problem of transmitting speech with reduced bandwidth in current practice do not achieve the lowest possible bandwidth, because they operate on the electrical representation of speech, not the speech content. Examples are the well-known speech compression algorithms Adaptive Digital Pulse-Code Modulation (ADPCM) and the algorithm used in US digital cellular IS-54. Other vocoder-based techniques can achieve data rates just below 1 kbit,/sec. (See U.S. Pat. No. 4,489,433 to Suchiro et al as a technique that identifies and encodes syllable-level components of speech). In Suehiro the minimal data rate depends on the number of words uttered per minute, the length of the textual representation of each word, and the extent to which standard (e.g. Lempel-Ziv) compression algorithms can compress text. For a 150 word-per-minute speaker, whose words average six eight-bit characters in their representation, and for 2:1 compression, the data rate for just the textual component of the speech representation is 70 bits/sec.

SUMMARY OF THE INVENTION

These systems which utilize the invention are comprised of a transmitter or transduction part, in which the speech is converted from acoustic to a digital electrical representation and appropriately processed, a conveyance part, preferably a data communications network, which carries the representation, and a receiver or reproduction part, in which the electrical representation is recorded and possibly converted to acoustic form.

The object of the invention is to minimize the bandwidth required of the conveyance part, subject to constraints on the fidelity with which the reproduced speech mimics its original form. The general form of the invention is a feed-forward technique, in which a base representation of speech is supplemented by an error term.

The form of the transmitted representation is that of a character string representing a humanly-readable textual transcript of the original speech, accompanied by a greater or lesser amount of auxiliary data, that data used by the receiver to improve the fidelity of the reconstructed speech. Because one part of the transmitted form is (computer-recognized) speech, it has value beyond that for speech reconstruction. It forms a humanly-readable transcript of the speech which can be stored and searched. Because the other part (auxiliary data) represents a difference between a baseline reproduction of speech and an high-fidelity reproduction, choosing not to transmit small differences can reduce the bandwidth required for this part at the expense of fidelity. If the bandwidth of the data communications network varies autonomously (as it would if noise or interference were to become present) as long as the bandwidth is sufficient to transmit the textual part communication can be continued. If the reduction in bandwidth could be sensed by the transmitter it would omit some of the difference data, temporarily reducing fidelity but still retaining the ability to communicate. Additionally, if both parts of the transmitted form are stored, the textual part can serve as the basis of a searchable index to the reconstructed speech.

The transmitter is typically a personal computer system augmented with software for speech recognition and speech synthesis. The receiver may be a computer system as well, but is sufficiently simple so that dedicated implementations are practical. The data communications system can be as simple as a public switched telephone network with modem attachment, or may be a radio or other wireless network.

The invention is appropriate for use in any environment requiring the conveyance of speech, but because of the complexity and potential cost of its transmitter, most appropriately in environments where the bandwidth of the data communications facilities is extremely limited. Examples of such environments are deep space and submarine voice communications, highly robust voice communications systems such as battlefield voice systems, and traffic-laden facilities such as the Internet. Another configuration where the invention is appropriate is that of a shared link attached to a backbone network, typically a modem attached to the public switched telephone network dialed to an Internet service provider. Since the bandwidth for each voice call is very low, several conversations can share the same link. Also, since the bandwidth for each voice call is variable, statistics of the variability can be exploited to further increase the multiplexing ratio.

DESCRIPTION OF THE PREFERRED EMBODIMENT

Figure 1:
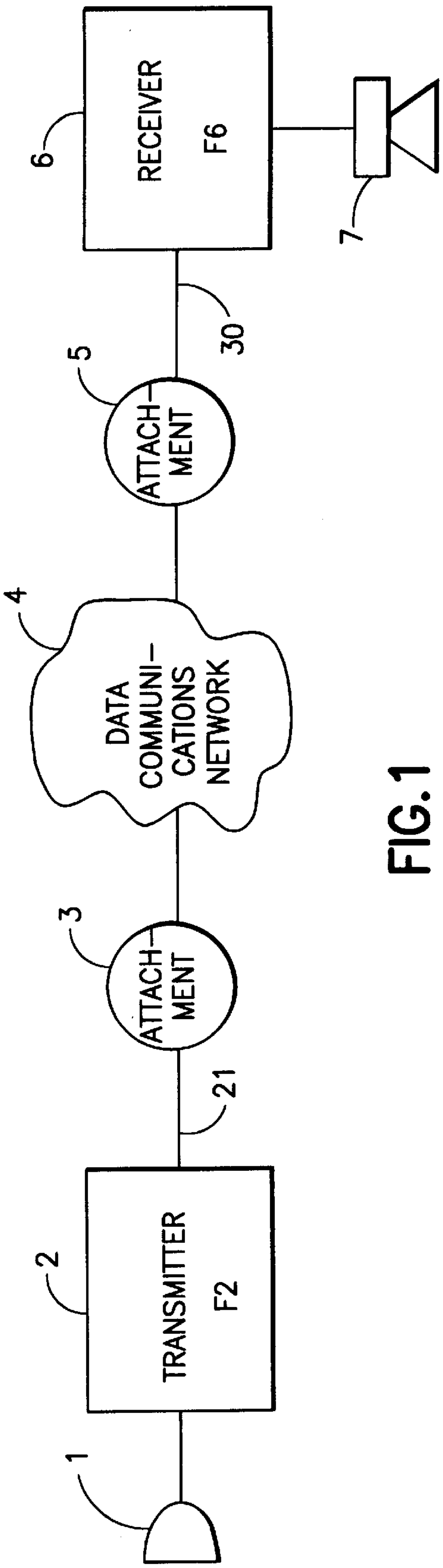
FIG. 1 schematically illustrates the system configuration in which the invention is implemented.

In FIG. 1 is shown the system configuration of a preferred embodiment of the invention. Microphone 1 transduces speech utterances for the transmitter 2. The encoding of the speech utterances could be for example pulse code modulation. Transmitter 2 further encodes these for transmission and provides control for the attachment 3, which provides attachment to the data communications network 4. Data communications network 4 conveys the transmitted encoded composite representation of speech 21 to receiver attachment 5. Receiver 6 controls receiver attachment 5 and receives the received encoded composite representation 30 from it. Receiver 6 reconstructs the original speech and supplies this reconstruction to speaker 7.

Figure 2:
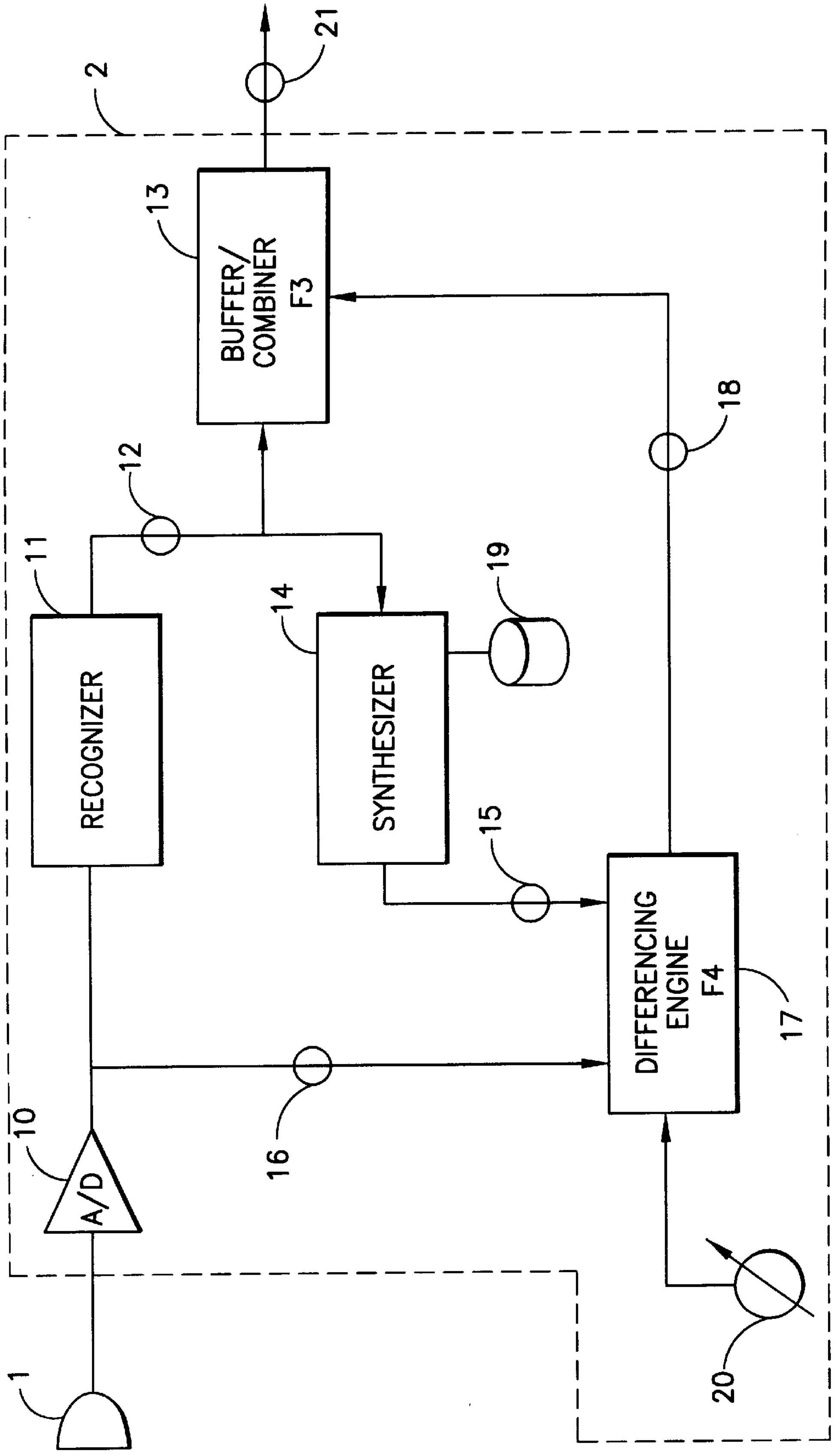
FIG. 2 schematically illustrates the transmitter of the system configuration.

In FIG. 2 is shown the internal configuration of the transmitter 2 which is comprised of analog-to-digital converter 10, recognizer 11, synthesizer 14 with its parameter storage 19, differencing engine 17 and buffer/combiner 13 together with their interconnections. Recognizing that the preferred embodiment is in software, this figure is taken to mean that each element 11, 13, 14, 17 is a software task or process, and that the outputs and inputs of these tasks or processes are interconnected as shown in the figure. Analog-to-digital converter 10 is an hardware component as is synthesizer parameter storage 19.

The original speech is transduced by microphone 1 and converted to a digital representation 16 by analog-to-digital converter 10. The specific form of 16 is immaterial to the invention but can be digital pulse-code modulation, for example. The recognizer 11 (a complex subsystem) operates on the speech representation 16 to produce a textual representation of speech 12, typically represented as an ASCII-encoded string of characters. Synthesizer 14 accepts this representation and produces a digital representation of speech 15 preferably of form similar to that of the original representation of speech 16 as further described below. The differencing engine 17 examines both the original speech representation 16 and the synthesized speech representation 15 and determines a difference representation 18 according to a fidelity parameter 20, which is the output of a control device which determines whether the representation of the error term is precise or approximate. A shaft encoder, for example, could be used to implement the fidelity parameter. This difference representation is encoded and combined with the textual representation of speech 12 in buffer/combiner 13, for example by time division multiplexing, which makes the resultant transmitted encoded composite representation 21 available to the output of the transmitter. See discussion of FIG. 5 below. The computer on which this software runs is responsible for sequencing the various tasks and determining synchronization between the various representations 16, 12, 15 and 18.

The construction and operation of the microphone 1, the analog-to-digital converter 10 are familiar to those skilled in the art of speech capture. The recognition engine 11 is not the subject of this invention, and is typically commercially available from such vendors as IBM, Lucent Systems and Dragon Systems. The synthesizer 14 is similarly not the subject of this invention, and is commercially available from such vendors as Lernout and Hauspie and Berkeley Systems.

Figure 3:
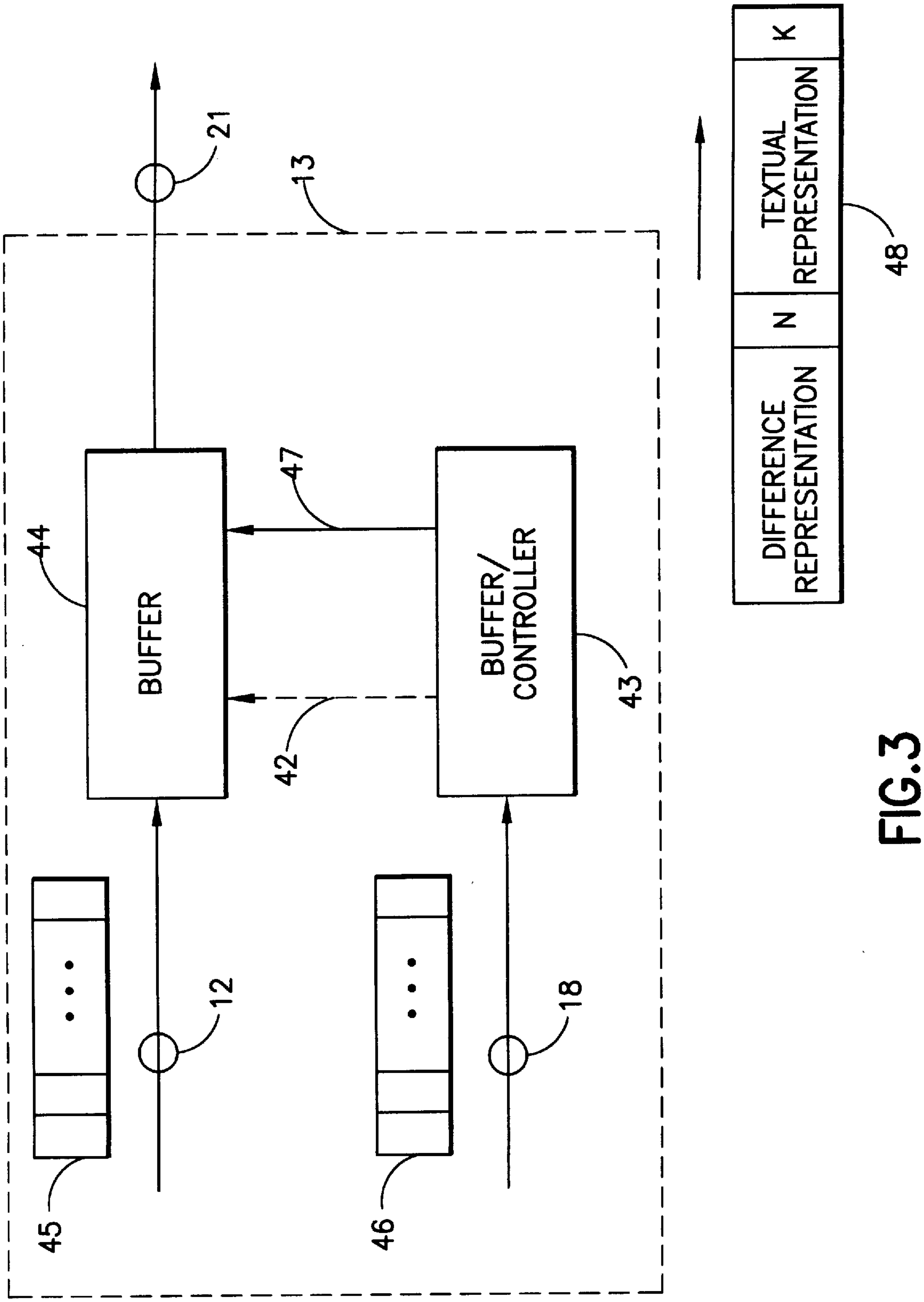
FIG. 3 schematically illustrates the buffer/combiner of the transmitter of FIG. 2.

FIG. 3 shows one possible internal structure of the buffer/combiner 13. Buffer/combiner 13 gets textual representation 12 and difference representation 18 which always lags textual representation 12 in time. This is because a subsequent processing step is required to derive difference representation 18 from textual representation 12. Multiplexor 44 is a first-in-first-out buffer followed by a multiplexor, whose implementation is well-known to those skilled in the software art. The buffer is loaded whenever textual representation 12 data arrives, typically in segments 45. Also typically in segments 46 the difference representation 18 is input to multiplexor controller 43. The function of multiplexor controller 43 is to exercise control 42 over multiplexor 44 and to supply difference representation segments 47 to multiplexor 44. Multiplexor controller 43 also causes multiplexor 44 to output composite data stream 21. The way in which multiplexor controller 43 exercises this control is described subsequently. The multiplexor controller, for example, could be implemented using a finite state automaton.

Difference representation 18 is accompanied by data which identifies a corresponding segment of textual representation 12. This data is generated by differencing engine 17. For example, if speech is restricted to discrete utterances, the segment of textual representation 12 that is identified is always one or several words. Multiplexor controller 43 accumulates textual representation data 12 unconditionally, but when a segment of difference representation 46 (containing N characters) arrives it contains a count K of the number of textual representation characters. This count is passed to buffered multiplexor 44 output for immediate release. The count is also used to "release" K textual representation characters from buffer 44 via control 42. Multiplexor controller 43 then passes the count N followed by N difference representation characters from segment 46 on connection 47 to the output of multiplexor 44 and signals multiplexor 44 to output those characters as well. The result is that transmitted encoded composite representation 21 consists of alternating sequences of K textual representation characters and N difference representation characters in the format 48 shown in FIG. 3.

Figure 4:
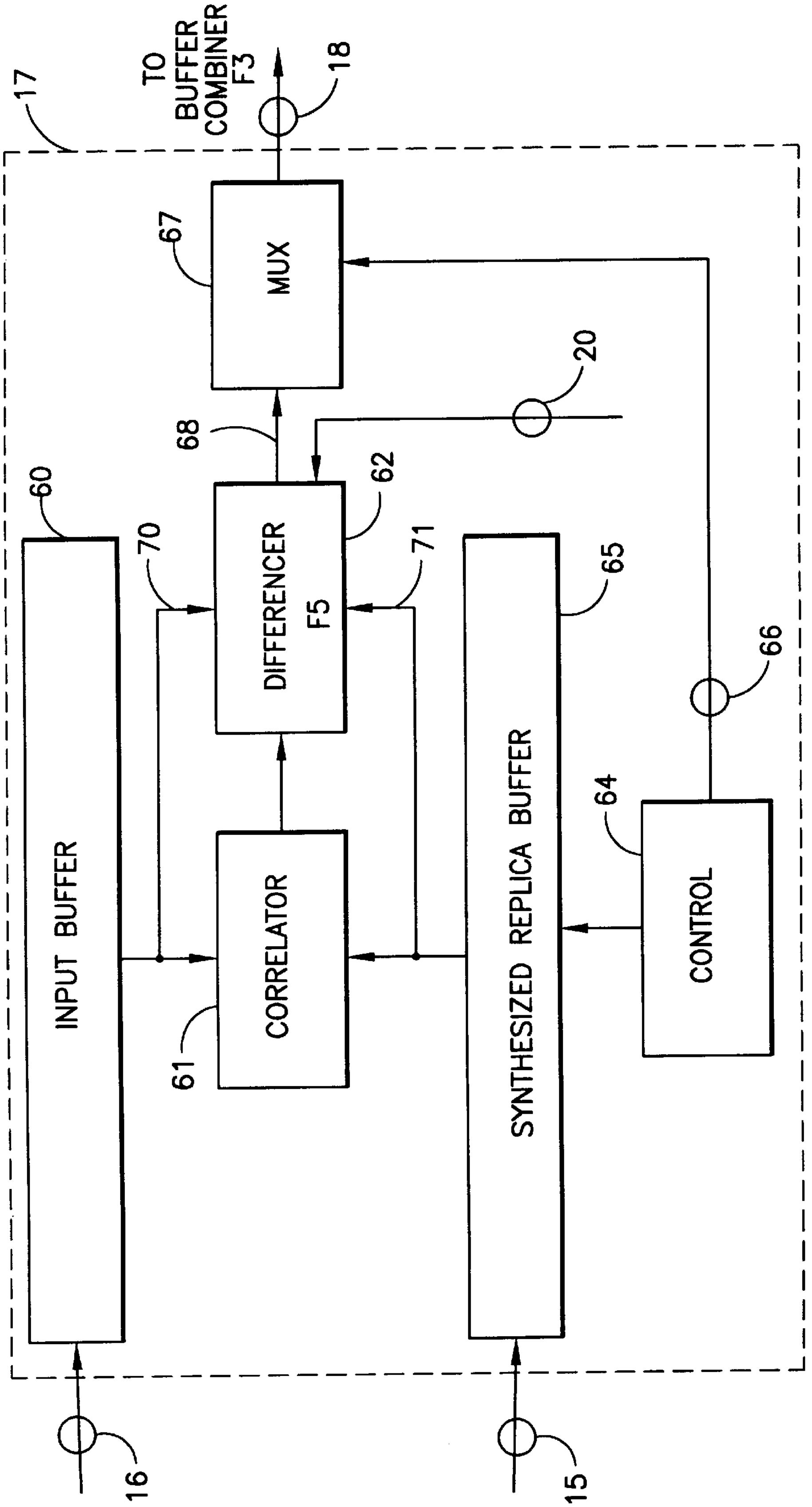
FIG. 4 schematically illustrates the differencing engine, which is part of the transmitter.

FIG. 4 shows one possible internal structure of the differencing engine. The differencing engine itself is not the object of this invention. To those skilled in the art, the differencing engine is an example of elastic matching. Elastic matching is commonly known in the art of handwriting recognition and its application in that domain has been described in an article by J. M. Kurtzberg and C. C. Tappert, "Symbol Recognition System by Elastic Matching," IBM Technical Disclosure Bulletin, Vol. 24, No. 6, pp. 2897–2902, November 1981. The differencing engine is shown here to complete the illustration of the invention.

Control 64, which can be implemented using a finite state automaton, exercises overall control over the components of the differencing engine 17, which comprises elements 60–62, 65 and 67 shown in FIG. 4. Input buffer 60 is loaded serially with the original representation of speech 16 under control of control 64. Synthesized replica buffer 65 is similarly loaded serially with the digital representation of speech 15. When both buffers are loaded control 64 activates correlator 61 which computes digitally the cross-correlation function of the contents of the input buffer and the contents of the synthesized replica buffer. The correlator 61 may, under influence of control 64 subsample and/or supersample the contents of the synthesized replica buffer 65 in order to perform elastic matching.

U.S. Pat. No. 5,287,415, "Elastic Prototype Averaging in Online Handwriting Recognition," T. E. Chefalas and C. C. Tappert, discloses an elastic-matching alignment technique using backpointers during the calculation of the match.

Figure 5:
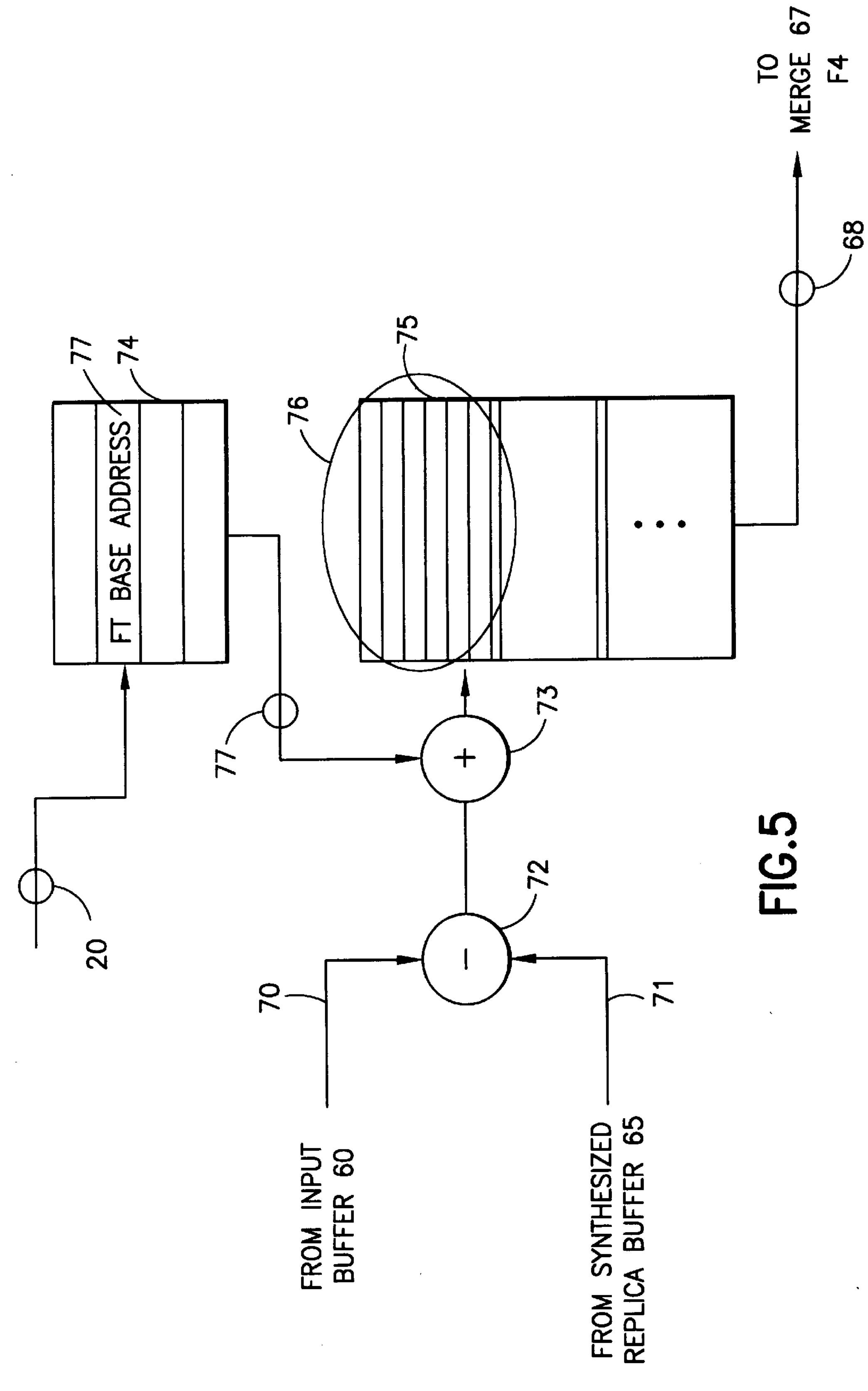
FIG. 5 schematically illustrates the difference of the differencing engine.

Although in that patent the purposes of the matching process is to form an averaged prototype for handwriting recognition, a precisely analogous procedure can be used to find the best match between the contents of the input buffer 60 and the synthesized replica buffer 65. In FIG. 5 of Chefalas et al is illustrated a best match between an anchor 66 and a sample 68 in which pairs of points of the anchor are found to correspond with single points of the sample. Here we refer to the sample as being "supersampled," or having its samples selectively replicated. If single points of the anchor are found to correspond with multiple points of the sample in the best match, we refer to the sample as being "subsampled," or having its samples selectively decimated. Control 66 maintains a record of sample replication (supersampling) and sample decimation (subsampling) during the elastic matching procedure as described in Chefalas et al. This record is periodically made available to multiplexor 67 or path 66.

After a matching operation is complete and the maximum of the correlation function is found, the differencer 62 computes the bit-by-bit difference between the contents of the input buffer 60 and the synthesized replica buffer 65 appropriately modified by the sub or supersampling of elastic matching. The differencer examines the value of corresponding speech samples and outputs either a difference of zero or a representation of the arithmetic difference depending on the value of the fidelity parameter 20. The parameters of sub or supersampling 66 as determined by control 64 are then multiplexed with the sample difference representation 68 as produced by differencer 62 in multiplexor unit 67, whose output 18 is the difference representation. This merging can be performed in many ways but preferably by prefixing the output of the differencer with predefined fields containing and identifying these parameters.

FIG. 5 shows one implementation of the differencer. Speech samples 70 and 71 are differenced in the subtractor 72. Fidelity parameter 20 is used as the address to a fidelity table memory 74, each of whose locations contains a fidelity table base address 77. This address is added to the sample difference in adder 73 to form a memory address to fidelity table memory 75. Shown in the figure is one of a multiplicity of fidelity tables 76 all of which reside in fidelity table memory 75. The output of fidelity table memory 75 is the sample difference representation 68. It is said that fidelity parameter 20 is "mapped" to a fidelity table base address by fidelity table address memory 74, and that the speech sample difference is "mapped" to a difference representation 68 by fidelity table memory 75. This memory-based mapping permits a nonlinear relationship between sample differences and their representation. The sample difference operation is a linear one, preserving information content. The mapping process is a nonlinear one, permitting a reduction in the size of the sample difference and allowing the differencer to ignore small differences between samples. This nonlinear differencing operation is an important feature of the invention and permits the variable data rate and variable fidelity characteristics.

The fidelity parameter can be implemented in various ways. This parameter can be determined as the output of a manually variable device such as a shaft encoder or through automated means, for example, as the output of a mechanism which estimates available network bandwidth for transmission. Note that the contents of the fidelity table memory 74 must be known in the receiver 6 in order to reconstruct the differences. Through means not shown, at the beginning of each session the contents of at least the selected fidelity table must be transmitted to the receiver. If the fidelity of the reconstruction is permitted to vary during the session, then a copy of all of the relevant fidelity tables must be transmitted to the receiver. Similarly, through means not shown, the initial value of the fidelity parameter must be transmitted to the receiver and if the fidelity is permitted to vary during the session the new value must also be transmitted.

Figure 6:
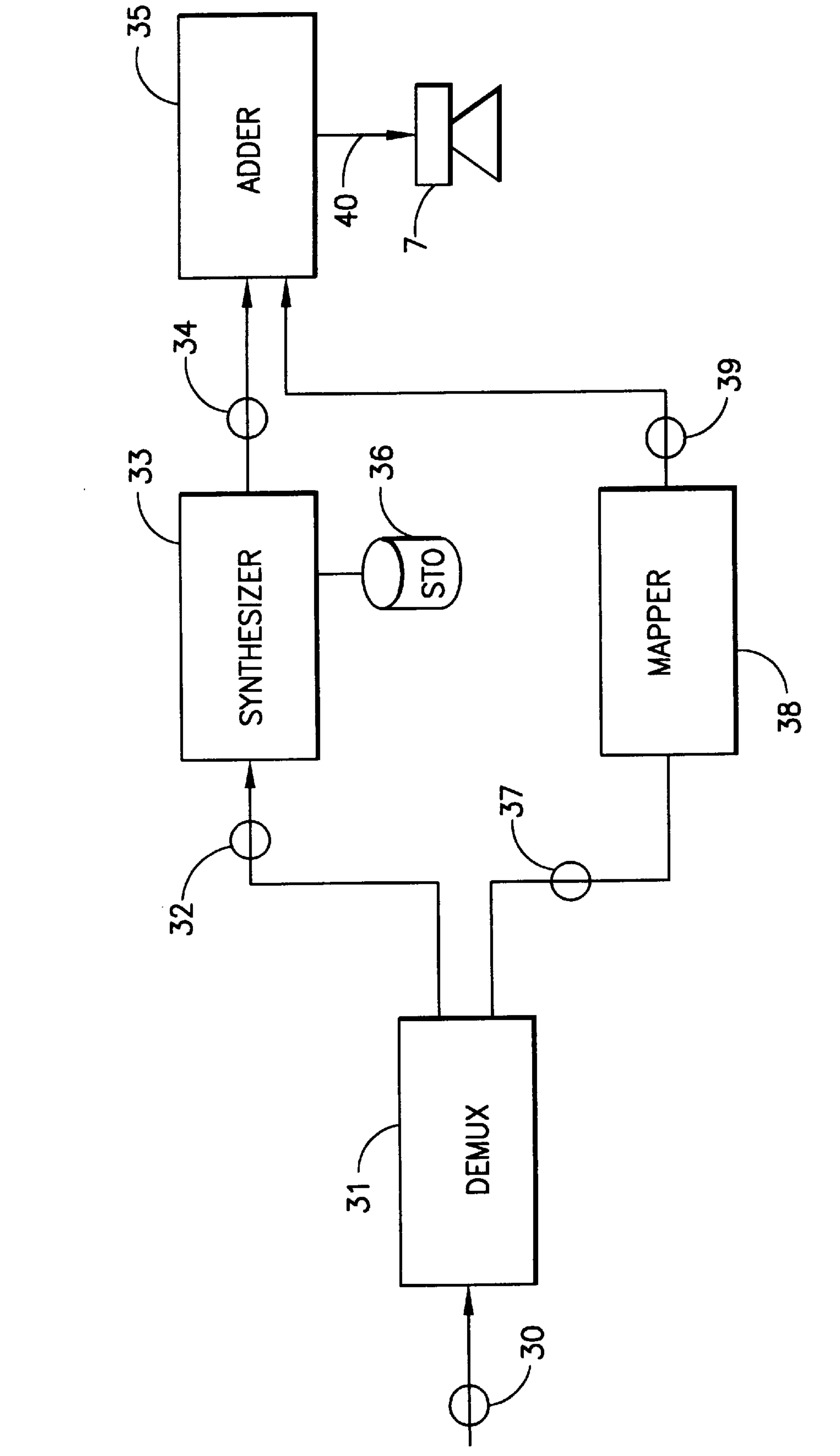
FIG. 6 schematically illustrates the receiver of the system configuration.

FIG. 6 shows the receiver. The received encoded composite representation data stream 30 from the receiver network attachment 5 is input to a splitter or demultiplexer 31, which splits it into two streams, that is, the difference representation and the textual representation as shown in 48 of FIG. 3. These are the received textual representation 32 and the received difference representation or error term 37. These are substantially identical to their counterparts 12 and 18, respectively, in the transmitter 2. The textual representation 32 is the input to receiver synthesizer 33 with synthesis parameter storage 36. Receiver synthesizer 33 and synthesis parameter storage 36 perform a conversion function on the received textual representation 32 in a manner substantially identical to transmitter synthesizer 14 with synthesis parameter storage 19.

Figure 7:
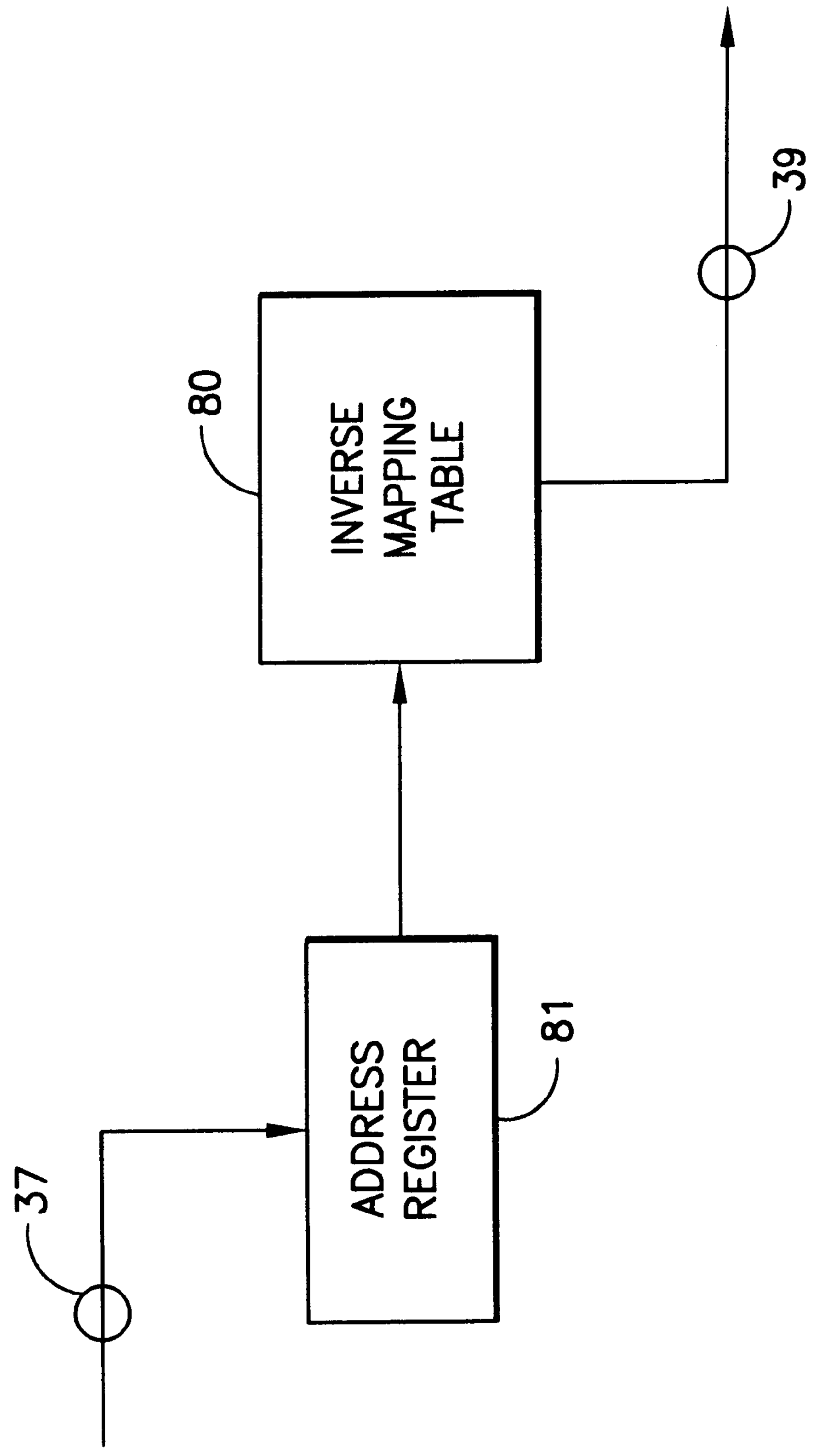
FIG. 7 schematically illustrates the mapper of the receiver, where the mapper modifies received difference representations by applying sub or super sampling corrections to it.

The mapper 38 modifies the received difference representation 37 by first applying the sub- or supersampling corrections to it. For example, if supersampling is employed by transmitter 2 for a particular segment of speech, a corresponding supersampling is employed by mapper 38. These corrections are supplied by the differencing engine control 64. Then a mapping inverse to that performed in differencer 62 is performed. With reference to FIG. 7, samples of the difference representation 37 are supplied to address register 81 which in turn supplies an address to Inverse Mapping Table 80. This table contains samples of the reconstructed error term 39. For example, if a particular sample difference x is computed by subtractor 72 resulting in a fidelity table memory output 68 of x', Inverse Mapping Table location x' would contain the value x.

The adder 35 combines the reconstructed error term 39 with the receiver synthesized speech 34 to produce received speech 40, reproduced by speaker 7. Received speech 40 may not be identical to the original speech representation 16 because of recognizer errors, errors in the differencing engine, or a setting of the fidelity parameter 20 in which error information which would have appeared in the transmitted difference representation 18 are suppressed by the differencing engine 17.

Having thus described our invention, what we claim as new and desire to secure by Letters Patent is:

1. A speech compressor, comprising:

a. a recognizer for converting an original speech signal to a text representation;

b. a synthesizer for reproducing a facsimile of said original speech signal from said text representation; and c. a differencing engine for determining an error term, which is the minimum difference between said original speech signal and said facsimile said original speech signal, said differencing engine comprising a first device for determining a minimum error term and a second device for compressing said minimum error term to reduce its bandwidth.

2. A speech compressor as recited in claim 1, further comprising:

a. a fidelity control device for adjusting said compressed minimum error term.

3. A speech compressor as recited in claim 2, wherein said fidelity control device comprises:

a. a device for measuring bandwidth of a communication medium on which said compressed representation of said original speech is to be transmitted; and b. a device for adjusting a fidelity parameter in response to said bandwidth measurement.

4. An apparatus as recited in claim 2 wherein said differencing engine uses correlation for synchronization between said original speech signal and said facsimile of said original speech signal.

5. A speech compressor as recited in claim 1, wherein said difference engine uses correlation for synchronization between said original speech signal and said facsimile of said original speech signal.

6. An apparatus as recited in claim 1, wherein said differencer comprises:

a. a fidelity table address memory;

b. a fidelity table memory;

c. an address adder, wherein a fidelity parameter determines a fidelity table address from said fidelity table address memory and wherein said fidelity table address is modified through addition of a difference between corresponding samples resulting in an address to said fidelity table memory, wherein contents at said address are samples of said compressed minimum error term.

7. An apparatus as recited in claim 6 wherein said differencing engine uses correlation for synchronization between said original speech signal and said facsimile of said original speech signal.

8. A speech decompressor for reconstructing original speech from text representation components and minimum error components of a speech signal, said minimum error components representing the difference between said original speech and a facsimile of said original speech, said decompressor comprising:

a. a synthesizer for reproducing a facsimile of said original speech signal from said text representation;

b. an error term decompressor for generating a facsimile of said minimum error component; and c. a device for adding said facsimile of said original speech signal and said facsimile of said minimum error component, thereby generating a reconstruction of said original speech signal.

9. A method as recited in claim 8, wherein said synthesizer further comprises means for controlling parameters to more accurately represent speech patterns of an individual speaker.

10. A method of compressing speech, comprising:

a. converting an original speech signal to a text representation;

b. reproducing a facsimile of said original speech signal from said text representation;

c. determining a minimum error term said minimum error term being the minimum difference between said original speech signal and said facsimile of said original speech signal; and d. compressing said minimum error term to reduce its bandwidth.

11. A method as recited in claim 10, further comprising the step of adjusting said compressor in accordance with bandwidth availability.

12. A method as recited in claim 11 wherein said determining further comprises correlating for synchronizing said original speech signal to said facsimile of said original speech signal.

13. A method as recited in claim 10, further comprising measuring the available media bandwidth for communicating said compressed speech and adjusting a fidelity parameter in response to said measured bandwidth.

14. A method as recited in claim 10 wherein said determining further comprises correlating for synchronizing said original speech signal to said facsimile of said original speech signal.

15. A method of reconstructing original speech signal from text representation components and minimum error components of said original speech signal, said method comprising:

a. reproducing a facsimile of said original speech signal from said text representation;

b. generating a facsimile of said minimum error component; and c. adding said facsimile of said original speech and said facsimile of said minimum error component to generate said original speech.

16. A speech compression system, comprising:

a. a speech compressor, comprising:

1) a recognizer for converting an original speech signal to a text representation;

2) a synthesizer for reproducing a facsimile of said original speech signal from said text representation; and 3) a differencing engine for determining an error term, which is the minimum difference between said original speech signal and said facsimile said original speech signal, said differencing engine comprising a first device for determining a minimum error term and a second device for compressing said minimum error term to reduce its bandwidth b. a speech decompressor comprising:

1) a synthesizer for reproducing a facsimile of said original speech signal from said text representation, 2) an error term decompressor for generating a facsimile of said minimum error component, and 3) a device for adding said facsimile of said original speech signal and said facsimile of said minimum error component.

17. An apparatus as recited in claim 16 wherein said differencing engine uses correlation for synchronization between said original speech signal and said facsimile of said original speech signal.

18. A speech transmission system, comprising:

a. a speech compressor, comprising:

1) a recognizer for converting an original speech signal to a text representation, 2) a synthesizer for reproducing a facsimile of said original speech signal from said text representation; and 3) a differencing engine for determining an error term, which is the minimum difference between said original speech signal and said facsimile said original speech signal, said differencing engine comprising a first device for determining a minimum error term and a second device for compressing said minimum error term to reduce its bandwidth b. a speech transmission facility for transmitting compressed signals from said speech compressor;

c. a receiving facility for receiving said compressed signals from said speech compressor; and d. a decompressor comprising:

1) a synthesizer for reproducing a facsimile of said original speech signal from said text representation, 2) an error term decompressor for generating a facsimile of said minimum error component, and 3) a device for adding said facsimile of said original speech signal and said facsimile of said minimum error component.

19. An apparatus as recited in claim 18 wherein said differencing engine uses correlation for synchronization between said original speech signal and said facsimile of said original speech signal.

20. A speech transmission system, comprising:

a. a speech compressor, comprising:

1) a recognizer for converting an original speech signal to a text representation, 2) a synthesizer for reproducing a facsimile of said original speech signal from said text representation; and 3) a differencing engine for determining an error term, which is the minimum difference between said original speech signal and said facsimile said original speech signal, said differencing engine comprising a first device for determining a minimum error term and a second device for compressing said minimum error term to reduce its bandwidth b. a storage facility for storing compressed signals that have been compressed by said speech compressor;

c. a retrieving facility for receiving said compressed signals from said storage facility; and d. decompressor comprising;

1) a synthesizer for reproducing a facsimile of said original speech signal from said text representation;

2) an error term decompressor for generating a facsimile of said minimum error component; and 3) a device for adding said facsimile of said original speech signal and said facsimile of said minimum error component.

21. An apparatus as recited in claim 20 wherein said differencing engine uses correlation for synchronization between said original speech signal and said facsimile of said original speech signal.

22. A method for providing speech transmission comprising the steps of:

a. converting an original speech signal to a text representation;

b. generating a first facsimile of said original speech signal from said text representation, said first facsimile comprising text representation components;

c. determining a minimum error term, said minimum error term being the minimum difference between said original speech signal and said first facsimile of said original speech signal;

d. transmitting said text representation of said original speech signal and said minimum error term;

e. receiving said text representation of said original speech signal and said minimum error term;

f. reproducing a second facsimile of said original speech signal from said text representation;

g. generating a facsimile of said minimum error term; and h. adding said second facsimile of said original speech signal and said facsimile of said minimum error term.

23. A method as recited in claim 22, further comprising the step of measuring the available media bandwidth for transmitting and adjusting a fidelity parameter in response to said measured bandwidth.

24. A method as recited in claim 22 wherein said determining further comprises correlating for synchronizing said original speech signal to said facsimile of said original speech signal.

25. A method for providing speech compression and decompression comprising the steps of:

a. converting an original speech signal to a text representation;

b. generating a first facsimile of said original speech signal from said text representation, said first facsimile comprising text representation components;

c. determining a minimum error term, said minimum error term being the minimum difference between said original speech signal and said first facsimile of said original speech signal;

d. storing said text representation of said original speech signal and said minimum error term;

f. retrieving said text representation of said original speech signal and said minimum error term;

g. reproducing a second facsimile of said original speech signal from said text representation;

h. generating a facsimile of said minimum error term; and i. adding said second facsimile of said original speech signal and said facsimile of said minimum error term.

26. A method as recited in claim 25 wherein said determining further comprises correlating for synchronizing said original speech signal to said facsimile of said original speech signal.

* * * * *